US011208510B2

(12) United States Patent
Standaert et al.

(10) Patent No.: US 11,208,510 B2
(45) Date of Patent: Dec. 28, 2021

(54) HIGH PURITY POLYPROPYLENES AND POLYPROPYLENE COMPOSITIONS FOR MOLDING

(71) Applicant: TOTAL RESEARCH & TECHNOLOGY FELUY, Seneffe (BE)

(72) Inventors: Alain Standaert, Brussels (BE); Davy Francois, Rhode-Saint-Genèse (BE); Geoffroy Terlinden, Wezembeek-Oppem (BE)

(73) Assignee: Total Research & Technology Feluy, Seneffe (BE)

( * ) Notice: Subject to any disclaimer, the term of this patent is extended or adjusted under 35 U.S.C. 154(b) by 191 days.

(21) Appl. No.: 16/477,582

(22) PCT Filed: Jan. 12, 2018

(86) PCT No.: PCT/EP2018/050726
§ 371 (c)(1),
(2) Date: Jul. 12, 2019

(87) PCT Pub. No.: WO2018/130638
PCT Pub. Date: Jul. 19, 2018

(65) Prior Publication Data
US 2019/0359746 A1   Nov. 28, 2019

(30) Foreign Application Priority Data
Jan. 13, 2017  (EP) .................................. 17151465

(51) Int. Cl.
| C08F 110/06 | (2006.01) |
| C08F 10/06 | (2006.01) |
| C08F 4/6592 | (2006.01) |
| C08L 23/10 | (2006.01) |
| B29C 45/00 | (2006.01) |
| B29K 23/00 | (2006.01) |

(52) U.S. Cl.
CPC ........ *C08F 110/06* (2013.01); *C08F 4/65927* (2013.01); *C08L 23/10* (2013.01); *B29C 45/0001* (2013.01); *B29K 2023/12* (2013.01); *C08F 10/06* (2013.01); *C08F 2800/20* (2013.01)

(58) Field of Classification Search
CPC ...... C08F 10/06; C08F 110/06; C08F 210/06; C08L 23/10; C08L 23/12
See application file for complete search history.

(56) References Cited

U.S. PATENT DOCUMENTS

| 5,504,172 A * | 4/1996 | Imuta | ...................... | C07F 17/00 526/351 |
| 5,874,505 A * | 2/1999 | Saito | ...................... | C08L 23/10 525/240 |
| 5,936,053 A * | 8/1999 | Fukuoka | .................. | C08F 10/06 526/351 |
| 6,096,843 A * | 8/2000 | Saito | ...................... | C08F 110/06 526/127 |
| 6,207,600 B1 * | 3/2001 | Nakajima | .............. | D04H 3/007 442/311 |
| 6,635,733 B2 * | 10/2003 | Yahata | ..................... | C08F 10/00 526/160 |
| 6,770,355 B1 * | 8/2004 | Minami | ................... | B29D 7/01 428/220 |
| 7,473,751 B2 * | 1/2009 | Cooper | ................... | C08F 10/06 428/220 |
| 7,569,651 B2 * | 8/2009 | Schottek | ................. | C08F 10/00 526/348 |
| 8,030,426 B2 * | 10/2011 | Fuchs | ................... | C08F 110/06 526/351 |

(Continued)

FOREIGN PATENT DOCUMENTS

| EP | 0277004 A1 | 8/1988 |
| EP | 0427696 A2 | 5/1991 |

(Continued)

OTHER PUBLICATIONS

R. B. Bird, R. C. Armstrong and O. Hasseger, Dynamics of Polymeric Liquids, vol. 1, p. 169-253, Fluid Mechanics, 2nd Edition, John Wiley & Sons (1987).
International Search Report issued in Application No. PCT/EP2018/050726, dated Apr. 12, 2018, 3 pages.
G.J. Ray et al., "Carbon-13 Nuclear Magnetic Resonance Determination of Monomer Composition and Sequence Distribution in Ethylene-Propylene Copolymers Prepared with a Stereoregular Catalyst System"; Macromolecules, vol. 10, No. 4, 1977, p. 773-778.
Plastics Additives Handbook, ed. H. Zweifel, 5th edition, 2001, Hanser Publishers.
Razavi et al., The Geometry of the Site and its Relevance for Chain Migration and Stereospecificity, Macromol. Symp., vol. 89, pp. 345-367, 1995.

(Continued)

Primary Examiner — Rip A Lee
(74) Attorney, Agent, or Firm — Albert Shung

(57) ABSTRACT

The invention relates to high purity polypropylenes and polypropylene compositions suitable for injection molding in which the polypropylene is characterized by a percentage of 2,1-insertions, relative to the total number of propylene molecules in the polymer chain, of at least 0.2%; a melting temperature $T_m$ ranging from 140° C. to 160° C. as determined according to ISO 3146; a ratio of frequencies at fixed modulus of 1000 Pa for storage shear modulus (G') and loss shear modulus (G") greater than 4.7; a molecular weight distribution (MWD) of at least 2.5; a number average molecular weight (Mn) of at most 45 kg/mol and Carreau-Yasuda parameters $\eta_0$, b and $\tau$ complying with the relationship:

$$2.18 - 1.715(b) - 0.015(\mathrm{Ln}\,\eta_0)^2 + 0.944(b)^2 + 0.0149(\mathrm{Ln}\,\eta_0)(\mathrm{Ln}\,\tau) + 0.0095(\mathrm{Ln}\,\tau)^2 > 1$$

when fitted to the CY equation, said CY parameters $\eta_0$, b and $\tau$ are determined from a dynamic rheology analysis (RDA).

15 Claims, No Drawings

(56) References Cited

U.S. PATENT DOCUMENTS 8,058,350 B2 * 11/2011 Berta ............... C08L 23/10
525/240
2004/0030051 A1 * 2/2004 Okumura ............ C08F 4/65927
525/240

FOREIGN PATENT DOCUMENTS

EP 2231726 B1 1/2014
WO 2014096171 A1 6/2014

OTHER PUBLICATIONS

H.N. Cheng, et al., "13C Nuclear Magnetic Resonance Characterization of Poly(propylene) Prepared with Homogeneous Catalysts", Makromol. Chem., vol. 190 (1989), pp. 1931-1940.

* cited by examiner

HIGH PURITY POLYPROPYLENES AND POLYPROPYLENE COMPOSITIONS FOR MOLDING

CROSS-REFERENCE TO RELATED APPLICATIONS

This application claims the benefit of PCT/EP2018/050726 filed Jan. 12, 2018, which claims priority from EP 17151465.6 filed Jan. 13, 2017, which are incorporated herein by reference in their entireties for all purposes.

FIELD OF THE INVENTION

The present invention relates to high purity polypropylene and polypropylene compositions suitable for moulding, and in particular for injection moulding. The present invention also relates to moulded articles made thereof.

BACKGROUND OF THE INVENTION

Polypropylene is today widely used in the industry. The main reasons are an easy processing in different transformation techniques and a mix of good mechanical properties in the temperature range—20° C. to 100° C. Nowadays, in order to follow evolving norms, it is required that the polypropylene further shows high purity.

In particular, for stringent applications such as thin-walled injection moulding, or when used in compounding processes to prepare polypropylene compositions, there is still a need for high purity polypropylene resins that achieve the requirements in terms of material processability. Indeed, these applications require resins having a viscosity sufficient to fill machine cavities in injection moulding or to impregnate the filler (talc, calcium carbonate, etc.) or the reinforcement material (fibreglass, natural fibres, etc.) in case of a compounding process. To date, the known polypropylene resins suitable for such applications do not exhibit the targeted resin purity combined with all the other properties required for the given applications. Thus, the injection moulders experience issues in resin organoleptic properties, and the compositions (or compounds) made with such resins do not pass requirements in air emission.

The purity of the propylene polymer can be characterized by the amount of volatiles. The volatiles are substances being driven off as vapour at room or slightly elevated temperatures, from a polymer. Reducing the emissions of volatiles from the polymeric material is a target for several years and is for example pursued by applying purification steps in the production of the polypropylene (such as degassing for example) or by using special additives (such as absorbers for example). However, additional process steps or additives involve additional costs, and there is a need for the production of polypropylene and polypropylene compositions having an improved purity in a cost-effective way.

High purity polypropylene resins produced without said additional steps and/or additives are also known from prior art, but they do not meet the requirements in material processability. In other words, it is not possible to inject the resins properly or to properly impregnate fillers with them, resulting in compositions unsuitable for optimal injection moulding and resulting, for example, in unfilled moulds, long cycle times, voids in fibre impregnation.

Thus, an object of the invention is to provide polypropylenes or polypropylene compositions with an improved balance of processability and purity.

Impact/rigidity balance combined with good optical properties such as haze/gloss are also key properties in moulding. It is known that improving impact and transparency leads to a decrease in rigidity. It is also known that increasing processability is detrimental to the impact property. Thus, another object of the invention is to provide polypropylenes or polypropylene compositions with an improved balance of processability, purity and mechanical properties such as rigidity.

It is also an object of the invention to provide polypropylenes or polypropylene compositions with an improved balance of processability, purity, optical and mechanical properties such as rigidity.

It is also an object of the invention to provide polypropylenes or polypropylene compositions with an improved balance of processability and purity, without the need to use special compounding equipment and/or additives during the preparation of these polymers and compositions. Thus, it is an object of the invention to provide polypropylenes or polypropylene compositions with an improved balance of processability and purity produced in a cost-effective way.

SUMMARY OF THE INVENTION

According to a first aspect, the invention provides a polypropylene characterized by:
i. a percentage of 2,1-insertions, relative to the total number of propylene molecules in the polymer chain, of at least 0.2%;
ii. a melting temperature $T_m$ ranging from 140° C. to 160° C. as determined according to ISO 3146;
iii. a ratio of frequencies at fixed modulus of 1000 Pa for storage shear modulus (G') and loss shear modulus (G") greater than 4.7;
iv. Carreau-Yasuda (CY) parameters $\eta_0$, b and $\tau$ complying with the relationship:

$$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2>1$$

when fitted to the CY equation, said CY parameters $\eta_0$, b, and $\tau$ are determined from a dynamic rheology analysis (RDA).

According to another definition the invention provides a polypropylene characterized by:
i. a percentage of 2,1-insertions, relative to the total number of propylene molecules in the polymer chain, of at least 0.2%;
ii. a melting temperature $T_m$ ranging from 140° C. to 160° C. as determined according to ISO 3146;
iii. a ratio of frequencies at fixed modulus of 1000 Pa for storage shear modulus (G') and loss shear modulus (G") greater than 4.7;
iv. Carreau-Yasuda (CY) parameters $\eta_0$, b and $\tau$ complying with the relationship:

$$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2>1$$

when fitted to the CY equation, said CY parameters $\eta_0$, b, and $\tau$ are determined from a dynamic rheology analysis (RDA);
v. a molecular weight distribution (MWD) of at least 2.5; and
vi. a number average molecular weight (Mn) of at most 45 kg/mol.

According to a second aspect, the invention provides a polypropylene composition comprising a polypropylene characterized by:

i. a percentage of 2,1-insertions, relative to the total number of propylene molecules in the polymer chain, of at least 0.2%;
ii. a melting temperature $T_m$ ranging from 140° C. to 160° C. as determined according to ISO 3146;
iii. a ratio of frequencies at fixed modulus of 1000 Pa for storage shear modulus (G') and loss shear modulus (G") greater than 4.7;
iv. Carreau-Yasuda (CY) parameters $\eta_0$, b and τ complying with the relationship:

$$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2>1$$

when fitted to the CY equation, said CY parameters $\eta_0$, b and τ are determined from a dynamic rheology analysis (RDA).
v. a molecular weight distribution (MWD) of at least 2.5; and
vi. a number average molecular weight (Mn) of at most 45 kg/mol.

With preference one or more of the following features can be used to better define the inventive polypropylene according to the first aspect of the invention:

The Carreau-Yasuda parameters $\eta_0$, b and τ comply with the relationship $$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2>1.02,$$

preferably $$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2>1.07.$$

The Carreau-Yasuda parameters $\eta_0$, b and τ comply with the relationship $$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2<1.50,$$

preferably $$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2<1.30.$$

The Carreau-Yasuda parameter b is greater than 0.3, preferably greater than 0.5.
The polypropylene has a molecular weight distribution is at least 2.6, preferably at least 2.7, more preferably at least 2.8.
The polypropylene has a number average molecular weight of at most 42 kg/mol, preferably at most 40 kg/mol, more preferably at most 38 kg/mol and even more preferably at most 35 kg/mol.
The polypropylene has a number average molecular weight of at least 15 kg/mol, preferably at least 18 kg/mol, and more preferably of at least 20 kg/mol.
The polypropylene has a xylene solubles content of less than 1.5 wt % relative to the total weight of the polypropylene, more preferably less than 1.0 wt %.
The polypropylene shows a flexural modulus of at least 1100 MPa being measured at 23° C. according to ISO 178, and/or a haze being less than 70% as determined according to ISO 14782.
The polypropylene has a content of mmmm pentads of at least 90%, preferably at least 95%, more preferably at least 97%, and even more preferably of at least 98% as determined by $^{13}$C-NMR analysis.
The polypropylene is a homopolymer, preferably the comonomer content in the polypropylene is less than 0.2 wt %, more preferably less than 0.1 wt %, even more preferably less than 0.05 wt % and most preferably less than 0.005 wt % based on the total weight of the polypropylene.
The polypropylene has a percentage of 2,1-insertions, relative to the total number of propylene molecules in the polymer chain, of at least 0.4%, preferably of at least 0.6%, more preferably of at least 0.8%.
The polypropylene has less than 100 ppm of volatile organic compounds as determined in accordance with ATD-GC-FID, preferably less than 85 ppm, more preferably of less than 70 ppm.
The polypropylene has a melting temperature $T_m$ of at least 140° C., preferably of at least 145° C., more preferably of at least 147° C., more preferably of at least 149° C. as determined according to ISO 3146.
The polypropylene has a melting temperature $T_m$ of at most 160° C., preferably of at most 158° C., more preferably of at most 155° C., more preferably of at most 153° C. as determined according to ISO 3146.
The polypropylene is polymerized in the presence of a supported bridged metallocene catalyst.
The polypropylene is polymerized in the presence of a supported metallocene catalyst having dimethylsilyl-bridged bis(indenyl)zirconium dichloride as metallocene component wherein the indenyl is substituted.
The polypropylene is polymerized in the presence of a metallocene catalyst having dimethylsilyl-bridged bis(indenyl)zirconium dichloride as metallocene component wherein the indenyl is substituted, and wherein the metallocene component is deposited on a support.
The polypropylene is polymerized in the presence of a supported metallocene catalyst wherein the metallocene component is selected from dimethylsilanediyl-bis(indenyl)zirconium dichloride, dimethylsilanediyl-bis(2-methyl-indenyl)zirconium dichloride, dimethylsilanediyl-bis(3-methyl-indenyl)zirconium dichloride, dimethylsilanediyl-bis(2-isopropyl-indenyl)zirconium, dimethylsilanediyl-bis(3-isopropyl-indenyl)zirconium dichloride, dimethylsilanediyl-bis(2-tert-butyl-indenyl)zirconium dichloride, dimethylsilanediyl-bis(3-tert-butyl-indenyl)zirconium dichloride, dimethylsilanediyl-bis(4,7-dimethyl-indenyl)zirconium dichloride, dimethylsilanediyl-bis(2,7-dimethyl-4-isoproyl-indenyl)zirconium dichloride, dimethylsilanediyl-bis(2-methyl-4,6-diisoproyl-indenyl)zirconium dichloride, dimethylsilanediyl-bis(tetrahydroindenyl)zirconium dichloride, dimethylsilanediyl-bis(benzindenyl)zirconium dichloride, dimethylsilanediyl-bis(2-methyl-4,5-benzindenyl)zirconium dichloride, dimethylsilanediyl-bis(2-ethyl-4,5-benzindenyl)zirconium dichloride, dimethylsilanediyl-bis(3,3'-2-methyl-benzindenyl)zirconium dichloride, dimethylsilanediyl-bis(4-phenyl-indenyl)zirconium dichloride, dimethylsilanediyl-bis(2-methyl-4-phenyl-indenyl)zirconium dichloride, dimethylsilanediyl-bis(2-ethyl-4-phenyl-indenyl)zirconium dichloride, dimethylsilanediyl-bis(2-methyl-4-isopropyl-indenyl) zirconium dichloride, dimethylsilanediylbis(2-methyl-4-[3',5'-dimethylphenyl]indenyl)zirconium dichloride, dimethylsilanediylbis(2-methyl-4-[4'-tert-butyl-phenyl]indenyl)zirconium dichloride, dimethylsilanediyl-bis(2-methyl-4-[4'-tert-butylphenyl]indenyl)-zirconium dichloride, dimethylsilanediylbis(2-ethyl-4-[4'-tert-butylphenyl]indenyl)zirconium dichloride, dimethylsilanediylbis(2-propyl-4-[4'-tert-butylphenyl] indenyl)zirconium dichloride, dimethylsilanediylbis(2-isopropyl-4-[4'-tert-butylphenyl]indenyl)zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, and mixtures thereof. Preferably the polypropylene is polymerized in the presence of a supported metallocene catalyst having dimethylsilyl-bridged bis(indenyl)zirconium dichloride as the metallocene component wherein the indenyl is substituted and wherein is selected from dimethylsilanediyl-bis(2-methyl-indenyl)zirconium dichloride and dimethylsilanediyl-bis(2-methyl-4-phenyl-indenyl)zirconium dichloride.

The polypropylene is polymerized in the presence of a supported metallocene catalyst and an activating agent, preferably the activating agent is selected from methylaluminoxane (MAO) and ethylaluminoxane, more preferably the activating agent is MAO.

The invention also encompasses the use of a supported metallocene catalyst having dimethylsilyl-bridged bis(indenyl)zirconium dichloride as metallocene component wherein the indenyl is substituted in a process to produce a polypropylene characterized by
  i. a percentage of 2,1-insertions, relative to the total number of propylene molecules in the polymer chain, of at least 0.2%;
  ii. a melting temperature $T_m$ ranging from 140° C. to 160° C. as determined according to ISO 3146;
  iii. a ratio of frequencies at fixed modulus of 1000 Pa for storage shear modulus (G') and loss shear modulus (G") greater than 4.7;
  iv. Carreau-Yasuda (CY) parameters $\eta_0$, b and $\tau$ complying with the relationship:

$$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2>1$$

when fitted to the CY equation, said CY parameters $\eta_0$, b and $\tau$ are determined from a dynamic rheology analysis (RDA);
  v. a molecular weight distribution (MWD) of at least 2.5; and
  vi. a number average molecular weight (Mn) of at most 45 kg/mol.

With preference, the supported metallocene catalyst having dimethylsilyl-bridged bis(indenyl)zirconium dichloride as metallocene component wherein the indenyl is substituted is selected from dimethylsilanediyl-bis(indenyl)zirconium dichloride, dimethylsilanediyl-bis(2-methyl-indenyl)zirconium dichloride, dimethylsilanediyl-bis(3-methyl-indenyl)zirconium dichloride, dimethylsilanediyl-bis(2-isopropyl-indenyl)zirconium, dimethylsilanediyl-bis(3-isopropyl-indenyl)zirconium dichloride, dimethylsilanediyl-bis(2-tert-butyl-indenyl)zirconium dichloride, dimethylsilanediyl-bis(3-tert-butyl-indenyl)zirconium dichloride, dimethylsilanediyl-bis(4,7-dimethyl-indenyl)zirconium dichloride, dimethylsilanediyl-bis(2,7-dimethyl-4-isoproyl-indenyl)zirconium dichloride, dimethylsilanediyl-bis(2-methyl-4,6-diisoproyl-indenyl)zirconium dichloride, dimethylsilanediyl-bis(tetrahydroindenyl)zirconium dichloride, dimethylsilanediyl-bis(benzindenyl)zirconium dichloride, dimethylsilanediyl-bis(2-methyl-4,5-benzindenyl)zirconium dichloride, dimethylsilanediyl-bis(2-ethyl-4,5-benzindenyl)zirconium dichloride, dimethylsilanediyl-bis(3,3'-2-methyl-benzindenyl)zirconium dichloride, dimethylsilanediyl-bis(4-phenyl-indenyl)zirconium dichloride, dimethylsilanediyl-bis(2-methyl-4-phenyl-indenyl)zirconium dichloride, dimethylsilanediyl-bis(2-ethyl-4-phenyl-indenyl)zirconium dichloride, dimethylsilanediyl-bis(2-methyl-4-isopropyl-indenyl)zirconium dichloride, dimethylsilanediylbis(2-methyl-4-[3',5'-dimethylphenyl]indenyl)zirconium dichloride, dimethylsilanediylbis(2-methyl-4-[4'-tert-butyl-phenyl]indenyl)zirconium dichloride, dimethylsilanediylbis(2-methyl-4-[4'-tert-butylphenyl]indenyl)-zirconium dichloride, dimethylsilanediylbis(2-ethyl-4-[4'-tert-butylphenyl]indenyl)zirconium dichloride, dimethylsilanediylbis(2-propyl-4-[4'-tert-butylphenyl]indenyl)zirconium dichloride, dimethylsilanediylbis(2-isopropyl-4-[4'-tert-butylphenyl]indenyl)zirconium dichloride, dimethylsilanediylbis(2-n-butyl-4-[4'-tert-butylphenyl]indenyl)zirconium dichloride, dimethylsilanediylbis(2-hexyl-4-[4'-tert-butylphenyl]indenyl)zirconium dichloride, and mixtures thereof.

Preferably the polypropylene is polymerized in the presence of a supported metallocene catalyst having dimethylsilyl-bridged bis(indenyl)zirconium dichloride as the metallocene component wherein the indenyl is substituted and wherein is selected from dimethylsilanediyl-bis(2-methyl-indenyl)zirconium dichloride and dimethylsilanediyl-bis(2-methyl-4-phenyl-indenyl)zirconium dichloride.

With preference, the use encompasses MAO as the activating agent.

With preference, the use encompasses the addition of hydrogen to the polymerization medium with a ratio $H_2/C_3$ higher than 0.03 Nl $H_2$/kg $C_3$.

Preferably the polypropylene composition of the invention comprises:
  A. from 10 to 95 wt % relative to the total weight of the composition of a polypropylene characterized by:
    i. a percentage of 2,1-insertions, relative to the total number of propylene molecules in the polymer chain, of at least 0.2%;
    ii. a melting temperature $T_m$ ranging from 140° C. to 160° C. as determined according to ISO 3146;
    iii. a ratio of frequencies at fixed modulus of 1000 Pa for storage shear modulus (G') and loss shear modulus (G") greater than 4.7;
    iv. Carreau-Yasuda (CY) parameters $\eta_0$, b and $\tau$ complying with the relationship:

$$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2>1$$

when fitted to the CY equation, said CY parameters $\eta_0$, b, and $\tau$ are determined from a dynamic rheology analysis (RDA),
    v. a molecular weight distribution (MWD) of at least 2.5; and
    vi. a number average molecular weight (Mn) of at most 45 kg/mol;
  and at least 5 wt % relative to the total weight of the composition of one or more selected from:
  B. from 0 to 50 wt % relative to the total weight of the composition of a filler;
  C. from 0 to 5 wt % relative to the total weight of the composition of a compatibilizer;
  D. from 0 to 90 wt % relative to the total weight of the composition of an elastomer, or of the mixture of an elastomer and a homopolymer of propylene, or of the mixture of an elastomer and a random copolymer of propylene;
  E. from 0 to 15 wt % relative to the total weight of the composition of a polyethylene.

With preference, the composition is devoid of VOC inhibitor, deodorant or odour absorbent.

The invention also encompasses the use of the polypropylenes or of the propylene compositions as defined above in injection moulding, for the manufacture of an injection moulded article.

The invention also relates to an article produced from the polypropylenes or from the polypropylene compositions as defined above. Preferably, the article is an injection moulded article, more preferably the article is selected from cup and tub.

The invention also relates to an article, such as an injection moulded article, produced from the polypropylenes or the polypropylene compositions as defined above. Preferably, the injection-moulded article is an automobile part.

DETAILED DESCRIPTION OF THE INVENTION

For the purpose of the invention, the terms "polypropylene" and "propylene polymer" may be used synonymously. The term "metallocene polypropylene" is used to denote a polypropylene produced with a metallocene-based polymerization catalyst. The term "ZN polypropylene" is used to denote a polypropylene produced with a Ziegler-Natta based polymerization catalyst.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of endpoints also includes the endpoint values themselves (e.g. from 1.0 to 5.0 includes both 1.0 and 5.0). Any numerical range recited herein is intended to include all sub-ranges subsumed therein.

The particular features, structures, characteristics or embodiments may be combined in any suitable manner, as would be apparent to a person skilled in the art from this disclosure, in one or more embodiments.

The term "polypropylene" or "polypropylene resin" as used herein refers to the polypropylene fluff or powder that is extruded, and/or melted and/or pelletized and can be produced through compounding and homogenizing of the polypropylene resin as taught herein, for instance, with mixing and/or extruder equipment. The term "fluff" or "powder" as used herein refers to the polypropylene material with the hard catalyst particle at the core of each grain and is defined as the polymer material after it exits the polymerization reactor (or final polymerization reactor in the case of multiple reactors connected in series).

The present invention provides a polypropylene characterized by:
  i. a percentage of 2,1-insertions, relative to the total number of propylene molecules in the polymer chain, of at least 0.2%;
  ii. a melting temperature $T_m$ ranging from 140° C. to 160° C. as determined according to ISO 3146;
  iii. a ratio of frequencies at fixed modulus of 1000 Pa for storage shear modulus (G') and loss shear modulus (G''), is greater than 4.7;
  iv. Carreau-Yasuda (CY) parameters $\eta_0$, b and $\tau$ complying with the relationship:

$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2>1$ when fitted to the CY equation, said CY parameters $\eta_0$, b, and $\tau$ are determined from a dynamic rheology analysis (RDA);
  v. a molecular weight distribution (MWD) of at least 2.5; and
  vi. a number average molecular weight (Mn) of at most 45 kg/mol.

Surprisingly, it has been discovered that polypropylenes of the specific rheology, as described by the rheological parameters defined in (iii) and (iv), in combination with a given percentage of 2,1-insertions and a specific melting temperature, show an improved balance of processability and purity over known polypropylenes. Indeed, it has been discovered that such polypropylene resins show low emission and low amount of volatile organic compounds (VOC) and at the same time better cycle times when injected. The resulting compositions, in which the inventive polypropylene resins are compounded with a filler are therefore suitable for optimal injection moulding.

It is known to the man skilled in the art that propylene polymers show a non-Newtonian viscosity, i.e. a viscosity changing with the shear rate. The Carreau-Yasuda (CY) model allows an analytical expression of the non-Newtonian viscosity curves. The CY model is a power function of the molecular weight (Mw) and is represented by equation (1):

$$\eta=\eta_0/(1+(\tau W)^b)^{((1-n)/b)} \quad (1)$$

where:
  $\eta$=viscosity (Pa·s)
  W=shear rate (1/s)
  b=rheological breadth parameter [describes the transition region between the zero-shear-rate region and the power-law region]
  $\tau$=relaxation time (s) [describes the location in time of the transition region]
  $\eta_0$=viscosity at zero shear rate (Pa·s) [defines the Newtonian plateau]
  n=power-law constant [define the final slope of the high shear rate region]

Rheological breadth refers to the breadth of the transition region between Newtonian and power-law type shear rate for a polymer or the frequency dependence of the viscosity of the polymer. The rheological breadth is a function of the relaxing time distribution of a polymer resin, which in turn is a function of the resin molecular structure of architecture. The rheological breadth may be calculated by fitting the flow curves generated in linear-viscoelastic dynamic oscillatory frequency sweep experiments with a CY model.

Details of the significance and interpretation of the CY model and derived parameters may be found in R. B. Bird, R. C. Armstrong and O. Hasseger, Dynamics of Polymeric Liquids, Volume 1, page 171-172, Fluid Mechanics, $2^{nd}$ Edition, John Wiley & Sons (1987), which is incorporated by reference herein.

It has been discovered that the CY parameters can be used to determine a rheological parameter of the polypropylene resins that allows, in combination with other parameters, to predict the achievement of the desired balance between processability and purity of said resin. The rheological parameter RP1 according to the invention is defined according to equation (2):

$$RP1=2.18-1.715(b)-0.015(\text{Ln } \eta_0)^2+0.944(b)^2+0.0149(\text{Ln } \eta_0)(\text{Ln } \tau)+0.0095(\text{Ln } \tau)^2 \quad (2)$$

Improved processability of the resin in injection moulding application or in compounding, while maintaining good organoleptic properties, has been observed when RP1 has a value greater than 1, preferably greater than 1.02, more preferably greater than 1.03, even more preferably greater than 1.05, most preferably greater than 1.07.

Thus, with preference, the polypropylenes of the invention have Carreau-Yasuda parameters $\eta_0$, b and $\tau$ complying with the following relationship:

$$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2>1.02,$$

more preferably $$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2>1.05,$$

even more preferably $$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2>1.07.$$

For optimal processability, the value of the RP1 is preferably kept less than 1.50, more preferably less than 1.30.

Thus, with preference, the polypropylenes of the invention have Carreau-Yasuda parameters $\eta_0$, b and $\tau$ complying with the following relationship:

$$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2<1.50$$

preferably $$2.18-1.715(b)-0.015(\text{Ln }\eta_0)^2+0.944(b)^2+0.0149(\text{Ln }\eta_0)(\text{Ln }\tau)+0.0095(\text{Ln }\tau)^2<1.30.$$

Preferably, the Carreau-Yasuda rheological breadth parameter "b" is greater than 0.3, more preferably greater than 0.5, when fitted to the Carreau-Yasuda (CY) equation.

Preferably, the polypropylene of the invention has a viscosity at zero shear rate ($\eta_0$) of less than 200 Pa·s, the viscosity being determined by RDA.

In an embodiment, the polypropylene of the invention further has the Carreau-Yasuda rheological breadth parameter "b" being greater than 0.3, preferably greater than 0.5; when fitted to the CY equation and show a viscosity at zero shear rate ($\eta_0$) being less than 200 Pa·s.

The Carreau-Yasuda parameter "n" (i.e. the power-law constant) is greater or equal to 0. Preferably, n is ranging from 0 to 0.5. The Carreau-Yasuda parameter "n" is determined by RDA.

Another rheological parameter RP2 to be used in combination with RP1 has been established to be the ratio of frequencies at fixed modulus of 1000 Pa for storage shear modulus (G') and loss shear modulus (G") and is given by the equation (3):

$$RP2=w(G'=1000)/w(G''=1000) \qquad (3)$$

The frequencies at fixed modulus of 1000 Pa for storage shear modulus (G') and loss shear modulus (G") are determined by RDA.

Such ratio has already been described in prior art as "separation modulus" but has never been used to the knowledge of the Applicant in connection with processability and purity of a polypropylene resin.

Preferably, w(G'=1000)/w(G"=1000) is greater than 4.8, more preferably greater than 4.9.

Preferably, the polypropylene has a melting temperature $T_m$ of at least 140° C., preferably of at least 145° C., preferably of at least 147° C., more preferably of at least 149° C. as determined according to ISO 3146.

Preferably, the polypropylene has a melting temperature $T_m$ of at most 160° C., preferably of at most 158° C., preferably of at most 155° C., more preferably of at most 153° C. as determined according to ISO 3146.

Preferably, the polypropylene of the invention is further characterized by a percentage of 2,1-insertions, relative to the total number of propylene molecules in the polymer chain, of at least 0.4%, more preferably of at least 0.6% and even more preferably of at least 0.8%. The percentage of 2,1-insertions may be determined as indicated in the test methods.

Preferably, the polypropylene of the invention is further characterized by a percentage of 2,1-insertions, relative to the total number of propylene molecules in the polymer chain, of at most 1.5%, more preferably of at most 1.3%. The percentage of 2,1-insertions may be determined as indicated in the test methods.

The polypropylene of the invention has a melt flow index (MFI) of at least 50 g/10 min, as determined according to ISO 1133, condition L, at 230° C. and 2.16 kg; preferably of at least 70 g/10 min, more preferably at least 100 g/10 min, even more preferably at least 110 g/10 min. Preferably, the polypropylene of the invention has a melt flow index (MFI) of at most 1000 g/10 min. The value of MFI of the polypropylene of the invention is obtained without degradation treatment.

In a preferred embodiment, the propylene of the invention has a molecular weight distribution (MWD), defined as Mw/Mn, i.e. the ratio of weight average molecular weight (Mw) over number average molecular weight (Mn) of at least 2.6, preferably at least 2.7, more preferably at least 2.8, and even more preferably of at least 2.9.

Preferably, the polypropylene of the invention has a molecular weight distribution (MWD), defined as Mw/Mn, i.e. the ratio of weight average molecular weight (Mw) over number average molecular weight (Mn) of at most 5, most preferably of at most 4.

The molecular weight distribution (MWD) of the propylene polymer may be monomodal or multimodal, for example bimodal. A multimodal molecular weight distribution is obtained by combining at least two propylene polymers having different melt flow index. The inventive polypropylene may be monomodal or multimodal. However, it is preferred that the propylene polymer has a monomodal molecular weight distribution.

In a preferred embodiment, the propylene has a number average molecular weight (Mn) of at most 42 kg/mol, preferably at most 40 kg/mol, more preferably at most 38 kg/mol, even more preferably at most 35 kg/mol and most preferably of at most 34 kg/mol.

In an embodiment, the propylene has a number average molecular weight (Mn) of at least 15 kg/mol, preferably at least 18 kg/mol, and more preferably at least 20 kg/mol.

Preferred range for the number average molecular weight (Mn) of the propylene according to the invention is from 18 kg/mol to 40 kg/mol, preferably from 20 kg/mol to 35 kg/mol.

Preferably, the polypropylene of the invention is characterized by a high isotacticity, for which the content of mmmm pentads is a measure. Preferably the content of mmmm pentads is at least 90%, more preferably at least 95%, even more preferably at least 97% and most preferably of at least 98%. The isotacticity may be determined by $^{13}$C-NMR analysis as described in the test methods part.

Preferably, the inventive polypropylene has a xylene solubles content of less than 1.5 wt % relative to the total weight of the polypropylene, more preferably less than 1.0 wt %. Xylene solubles are determined as described in the test methods part.

In another embodiment, the polypropylene of the invention has a viscosity measured at 1000 rad/s being less than 1.7 Pa·s, preferably less than 1.6 Pa·s, more preferably of less than 1.5 Pa·s The viscosity at 1000 rad/s (n) being determined by RDA.

With preference, the polypropylene of the invention has less than 100 ppm of volatile organic compounds as determined in accordance with ATD-GC-FID, preferably less than 85 ppm, more preferably of less than 70 ppm.

Preferably, the polypropylene has a spiral flow of at least 550 mm as determined at 800 bar pressure and 210° C. of melting temperature, more preferably of at least 600 mm, most preferably of at least 650 mm, even more preferably of at least 700 mm. Spiral flow is determined as indicated in the test methods part.

Preferably, the polypropylene of the invention has a flexural modulus of at least 1100 MPa, preferably at least 1200 MPa, the flexural modulus being measured at 23° C. according to ISO 178.

Preferably, the haze of the polypropylene according to the invention is less than 70%, more preferably less than 65%, the haze being determined according to ISO 14782.

Preferably, the inventive polypropylene can be homopolymer or copolymer of propylene and at least one comonomer. Said comonomers can be selected from the group consisting of ethylene and $C_4$-$C_{10}$ alpha-olefins, such as 1-butene, 1-pentene, 1-hexene, 1-octene.

In a preferred embodiment of the invention, the polypropylene of the invention is a homopolymer of propylene. A homopolymer according to this invention has less than 0.2 wt %, preferably less than 0.1 wt %, more preferably less than 0.05 wt % and most preferably less than 0.005 wt %, of alpha-olefins other than propylene in the polymer. Most preferred, no other alpha-olefins are detectable. Accordingly, when the polypropylene of the invention is a homopolymer of propylene, the comonomer content in the polypropylene is less than 0.2 wt %, more preferably less than 0.1 wt %, even more preferably less than 0.05 wt % and most preferably less than 0.005 wt % based on the total weight of the polypropylene.

In case the propylene polymer is a propylene copolymer, the copolymer is a random copolymer. The random propylene copolymers of the present invention comprise at least 0.1 wt % of comonomer(s), preferably at least 1 wt %. They comprise up to 10 wt % of comonomer(s) and most preferably up to 6 wt %. Preferably, the random copolymers are copolymers of propylene and ethylene.

In an embodiment, the polypropylene of the invention may also comprise further additives, such as by way of example, antioxidants, light stabilizers, acid scavengers, lubricants, antistatic additives, nucleating agents and colourants. An overview of such additives may be found in Plastics Additives Handbook, ed. H. Zweifel, 5$^{th}$ edition, 2001, Hanser Publishers.

Preferably, the polypropylene of the invention is produced using supported metallocene catalysts. Metallocene propylene homopolymers are the most preferred polypropylenes used in the present invention.

According to the invention, the polymerization of propylene and one or more optional comonomers is performed in the presence of one or more metallocene-based catalytic systems comprising one or more metallocenes, a support and an activating agent. Such metallocene-based catalytic systems are known to the person skilled in the art and need not be explained in detail.

The metallocene component used to prepare the metallocene polypropylene can be any bridged metallocene known in the art. Preferably it is a metallocene represented by the following general formula:

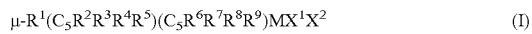

$$\mu\text{-}R^1(C_5R^2R^3R^4R^5)(C_5R^6R^7R^8R^9)MX^1X^2 \quad (I)$$

wherein:
  the bridge $R^1$ is —$(CR^{10}R^{11})_p$— or —$(SiR^{10}R^{11})_p$— with p=1 or 2, preferably it is —$(SiR^{10}R^{11})$—;
  M is a metal selected from Ti, Zr and Hf, preferably it is Zr;
  $X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl;
  $R^2$, $R^3$, $R^4$, $R^5$, $R^6$, $R^7$, $R^8$, $R^9$, $R^{10}$ and $R^{11}$ are each independently selected from the group consisting of hydrogen, $C_1$-$C_{10}$ alkyl, $C_5$-$C_7$ cycloalkyl, $C_6$-$C_{15}$ aryl, alkylaryl with $C_1$-$C_{10}$ alkyl and $C_6$-$C_{15}$ aryl, or any two neighboring R may form a cyclic saturated or non-saturated $C_4$-$C_{10}$ ring; each $R^2$, $R^3$, $R^4$, $R^5$, $R^6$, $R^7$, $R^8$, $R^9$, $R^{10}$ and $R^{11}$ may, in turn, be substituted in the same way.

The preferred metallocene components are represented by the general formula (I), wherein:
  the bridge $R^1$ is $SiR^{10}R^{11}$;
  M is Zr;
  $X^1$ and $X^2$ are independently selected from the group consisting of halogen, hydrogen, and $C_1$-$C_{10}$ alkyl; and $(C_5R^2R^3R^4R^5)$ and $(C_5R^6R^7R^8R^9)$ are indenyl of the general formula $C_9R^{12}R^{13}R^{14}R^{15}R^{16}R^{17}R^{18}R^{19}$, wherein $R^{12}$, $R^{13}$, $R^{14}$, $R^{15}$, $R^{16}$, $R^{17}$ and $R^{18}$ are each independently selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring;
  $R^{10}$ and $R^{11}$ are each independently selected from the group consisting of $C_1$-$C_{10}$ alkyl, $C_5$-$C_7$ and $C_6$-$C_{15}$ aryl, or $R^{10}$ and $R^{11}$ may form a cyclic saturated or non-saturated $C_4$-$C_{10}$ ring; and
  each $R^{10}$, $R^{11}$, $R^{12}$, $R^{13}$, $R^{14}$, $R^{15}$, $R^{16}$, $R^{17}$ and $R^{18}$ may, in turn, be substituted in the same way.

The polypropylenes produced with the preferred metallocene compounds have surprisingly been identified as having a very low content of volatile organic compounds (VOC) even at very low viscosity.

Particularly suitable metallocenes are those having $C_2$-symmetry.

Examples of particularly suitable metallocenes are:
dimethylsilanediyl-bis(cyclopentadienyl)zirconium dichloride,
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(2-tert-butyl-cyclopentadienyl)zirconium dichloride,
dimethylsilanediyl-bis(3-tert-butyl-cyclopentadienyl)zirconium dichloride,
dimethylsilanediyl-bis(2-tert-butyl-5-methyl-cyclopentadienyl)zirconium dichloride,
dimethylsilanediyl-bis(3-tert-butyl-5-methyl-cyclopentadienyl)zirconium dichloride, dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(2-isopropyl-indenyl)zirconium,
dimethylsilanediyl-bis(3-isopropyl-indenyl)zirconium dichloride,
dimethylsilanediyl-bis(2-tert-butyl-indenyl)zirconium dichloride
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(2,7-dimethyl-4-isoproyl-indenyl)zirconium dichloride,
dimethylsilanediyl-bis(2-methyl-4,6-diisoproyl-indenyl)zirconium dichloride
dimethylsilanediyl-bis(tetrahydroindenyl)zirconium dichloride,
dimethylsilanediyl-bis(benzindenyl)zirconium dichloride,
dimethylsilanediyl-bis(2-methyl-4,5-benzindenyl)zirconium dichloride,
dimethylsilanediyl-bis(2-ethyl-4,5-benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
dimethylsilanediyl-bis(2-methyl-4-phenyl-indenyl)zirconium dichloride,
dimethylsilanediyl-bis(2-ethyl-4-phenyl-indenyl)zirconium dichloride,
dimethylsilanediyl-bis(2-methyl-4-isopropyl-indenyl)zirconium dichloride,
dimethylsilanediylbis(2-methyl-4-[3',5'-dimethylphenyl]indenyl)zirconium dichloride,
dimethylsilanediylbis(2-methyl-4-[4'-tert-butyl-phenyl]indenyl)zirconium dichloride,
dimethylsilanediylbis(2-methyl-4-[4'-tert-butylphenyl]indenyl)-zirconium dichloride,
dimethylsilanediylbis(2-ethyl-4-[4'-tert-butylphenyl]indenyl)zirconium dichloride,
dimethylsilanediylbis(2-propyl-4-[4'-tert-butylphenyl]indenyl)zirconium dichloride,
dimethylsilanediylbis(2-isopropyl-4-[4'-tert-butylphenyl]indenyl)zirconium dichloride,
dimethylsilanediylbis(2-n-butyl-4-[4'-tert-butylphenyl]indenyl)zirconium dichloride,
dimethylsilanediylbis(2-hexyl-4-[4'-tert-butylphenyl]indenyl)zirconium dichloride
ethylene-bis(indenyl)zirconium dichloride,
ethylene-bis(tetrahydroindenyl)zirconium dichloride,
isopropylidene-(3-tert-butyl-5-methyl-cyclopentadienyl)(fluorenyl) zirconium dichloride.

The preferred metallocene component to produce the inventive polypropylene are dimethylsilyl-bridged bis(indenyl)zirconium dichloride, and among them dimethylsilyl bridged-bis(indenyl)zirconium dichloride wherein indenyl is substituted, such as:
dimethylsilanediyl-bis(2-methyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(4-phenyl-indenyl)zirconium dichloride,
dimethylsilanediyl-bis(2-methyl-4-phenyl-indenyl)zirconium dichloride.

It has been found that substitution of the indenyl group affects the polymer architecture such as the percentage of 2,1-insertions, the melting temperature $T_m$ and the percentage of mmmm pentads.

The metallocene is supported according to any method known in the art. The support used in the present invention can be any organic or inorganic solid, particularly porous supports such as talc, inorganic oxides, clays and clay minerals, ion-exchanged layered compounds, diatomaceous earth compounds, zeolites or a resinous support material, such as a polyolefin, for example. Preferably, the support material is an inorganic oxide in its finely divided form. Specific inorganic oxides include silica, alumina, magnesia, titania and zirconia, for example. Preferably, the inorganic support may comprise silica and/or alumina. The inorganic support may comprise from 10 to 100 wt % of silica and/or from 10 to 100 wt % of alumina.

In a preferred embodiment, the metallocene-based polymerization catalyst comprises an activating agent selected from alkyl aluminium, alumoxanes and boron-containing compounds. The activating agent can be an alkyl aluminium represented by formula $AlR*_nX_{3-n}$ wherein R* is an alkyl having from 1 to 20 carbon atoms, n is an integer between 0 and 3 and X is a halogen. The preferred alkyl aluminium may be triisobutylaluminium (TIBAL) or triethylaluminium (TEAL). The alkyl aluminium can be used in combination with a perfluoroborate e.g. $[Ph_3C][B(C_6F_5)_4]$ or $[Me_2NPhH][B(C_6F_5)_4]$. For example, using a combination of $[Ph_3C][B(C_6F_5)_4]$/TIBAL or of $[Me_2NPhN][B(C_6F_5)_4]$/TIBAL.

Suitable boron-containing agents may also be used for activating the bridged-metallocene component to form a metallocene-based polymerization catalyst. These include, for instance, a triphenylcarbenium boronate such as tetrakis(pentafluorophenyl)borato-triphenylcarbenium as described in EP-A-0427696, or those of the general formula $[L'-H]^+$ $[BAr^1Ar^2X^3X^4]^-$— as described in EP-A-0277004 (page 6, line 30 to page 7, line 7). The amount of boron-containing activating agent is selected to give a B/M ratio of from 0.5 to 5, preferably of about 1.

The activating agent may be an aluminoxane and may comprise oligomeric linear and/or cyclic alkyl aluminoxanes represented by the formula, for oligomeric, linear aluminoxanes:

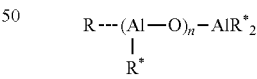

and by the formula, for oligomeric, cyclic aluminoxane:

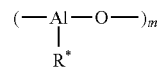

wherein n is 1-40, preferably 1-20, m is 3-40, preferably 3-20 and R* is a $C_1$-$C_8$ alkyl group and preferably methyl or isobutyl. Preferably, the activating agent is selected from methylaluminoxane (MAO) and ethylaluminoxane. More preferably, the activating agent is MAO. The amount of activating agent is selected to give an Al/M ratio of 10 to 10,000, preferably 100 to 10,000, more preferably of 200 to 4,000, even more preferably from 500 to 3,000, most preferably from to 1,000 to 3,000. The amount of activating agent depends upon its nature.

The metallocene-based polymerization catalyst may comprise a scavenger that may be selected from the group consisting of alkyl aluminium represented by formula wherein R* is an alkyl having from 1 to 20 carbon atoms, n is an integer between 0 and 3, and X is a halogen; or an aluminoxane. Said scavenger may be, for example, triethylaluminium, triisobutylaluminum, tris-n-octylaluminium, tetraisobutyldialuminoxane, diethylzinc, tris-n-hexyl aluminium, diethylchloroaluminum or MAO. Usually, the scavenger is added after activation of the metallocene component with the activating agent. Preferably, the scavenger is different from the activating agent.

The polymerization of propylene and one or more optional comonomers in presence of a metallocene-based catalytic system can be carried out according to known techniques in one or more polymerization reactors. The metallocene polypropylenes of the present invention are preferably produced by polymerization in liquid propylene at temperatures in the range from 20° C. to 100° C. Preferably, temperatures are in the range from 60° C. to 80° C. Variation of the polymerization temperature also influences the percentage of mmmm pentads of the polypropylene. The pressure can be atmospheric or higher. It is preferably between 25 and 50 bar. The molecular weight of the polymer chains, and in consequence the melt flow of the metallocene polypropylene, is regulated by the addition of hydrogen to the polymerization medium.

The ratio $H_2/C_3$ affects the rheological parameters according to the invention. Should the desired rheological properties not be obtained, the person skilled in the art may consider an increase of such ratio. In a preferred embodiment, the ratio $H_2/C_3$ is higher than 0.03 Nl $H_2$/kg $C_3$.

Preferably, the metallocene polypropylene is recovered from the one or more polymerization reactors without post-polymerization treatment to reduce its molecular weight and/or narrow its molecular weight distribution, such as can be done by thermal or chemical degradation. An example of chemical degradation is visbreaking, wherein the polypropylene is reacted for example with an organic peroxide at elevated temperatures, for example in an extruder or pelletizing equipment.

The invention also encompasses polypropylene compositions comprising the polypropylene as defined above.

The invention also relates to a polypropylene composition comprising a polypropylene characterized by:
i. a percentage of 2,1-insertions, relative to the total number of propylene molecules in the polymer chain, of at least 0.2%;
ii. a melting temperature $T_m$ ranging from 140° C. to 160° C. as determined according to ISO 3146;
iii. a ratio of frequencies at fixed modulus of 1000 Pa for storage shear modulus (G') and loss shear modulus (G") greater than 4.7;
iv. Carreau-Yasuda (CY) parameters go, b and τ complying with the relationship:

$$2.18-1.715(b)-0.015(\text{Ln } \eta_0)^2+0.944(b)^2+0.0149(\text{Ln } \eta_0)(\text{Ln } \tau)+0.0095(\text{Ln } \tau)^2 > 1$$

when fitted to the CY equation, said CY parameters go, b, and τ being determined from a dynamic rheology analysis (RDA).
v. a molecular weight distribution (MWD) of at least 2.5; and
vi. a number average molecular weight (Mn) of at most 45 kg/mol.

Preferably the composition of the invention comprises:
A. from 10 to 95 wt %, preferably from 40 to 95 wt %, relative to the total weight of the composition of a polypropylene according to the invention; and one or more selected from:
B. from 0 to 50 wt %, preferably from 0.5 to 50 wt %, relative to the total weight of the composition of a filler;
C. from 0 to 5 wt %, preferably from 0.1 to 5 wt %, relative to the total weight of the composition of a compatibilizer;
D. from 0 to 90 wt %, preferably from 0.5 to 90 wt %, relative to the total weight of the composition of an elastomer, of the mixture of an elastomer and a homopolymer of propylene or of the mixture of an elastomer and a random copolymer of propylene;
E. from 0 to 15 wt %, preferably from 0.5 to 15 wt % relative to the total weight of the composition of a polyethylene.

Component A) is the polypropylene of the invention as defined above in all its embodiments; i.e. a polypropylene characterized by:
i. a percentage of 2,1-insertions, relative to the total number of propylene molecules in the polymer chain, of at least 0.2%;
ii. a melting temperature $T_m$ ranging from 140° C. to 160° C. as determined according to ISO 3146;
iii. a ratio of frequencies at fixed modulus of 1000 Pa for storage shear modulus (G') and loss shear modulus (G") greater than 4.7; and,
iv. Carreau-Yasuda (CY) parameters $\eta_0$, b and τ complying with the relationship:

$$2.18-1.715(b)-0.015(\text{Ln } \eta_0)^2+0.944(b)^2+0.0149(\text{Ln } \eta^0)(\text{Ln } \tau)+0.0095(\text{Ln } \tau)^2 > 1$$

when fitted to the CY equation, said CY parameters n, $\eta_0$, b and τ being determined from a dynamic rheology analysis (RDA);
v. a molecular weight distribution (MWD) of at least 2.5; and
vi. a number average molecular weight (Mn) of at most 45 kg/mol.

The polypropylene is preferably used without any degradation treatment that could affect the viscosity or the organoleptic properties of the polymer. Thus, the molecular weights of component A) are substantially those obtained in the polymerization process used to prepare the propylene polymers.

Preferably, the composition of the invention comprises from 10 to 95 wt % of a polypropylene according to the invention, preferably from 40 to 95 wt %, relative to the total weight of the composition; and at least 5 wt % of one or more selected from component B), C), D), and E) relative to the total weight of the composition.

The composition optionally comprises filler B). A preferred filler is one or more selected from reinforcement material, pigments, metallic flakes, glass flakes, milled glass, glass spheres and mineral fillers such as talc, wollastonite, calcium carbonate, mica, silicates, kaolin, barium sulfate, metal oxides and hydroxides.

Preferred reinforcement material comprises one or more fibres selected from an organic or inorganic material such as fibres made of glass, metal, ceramic, graphite, bamboo and organic polymers such as polyesters and nylons, e.g.

aramids, in filamentary form, all of which are commercially available. Preferably, the reinforcement material comprises glass fibres.

Preferred pigments include organic and inorganic substances and are one or more selected from carbon black, $TiO_2$, ZnO, chromium oxides, iron oxides, azo pigments, phthalocyanines, quinacridones, perylene pigments, naphthalene derivates, isoindo lines, anthraquinone pigments.

The composition according to the invention optionally comprises a compatibilizer C). One type which can be used is low molecular weight compounds having reactive polar groups, which serves to make the fillers and pigments less hydrophilic and therefore more compatible with the polymer. Suitable compounds are, for example, silanes such as aminosilanes, epoxysilanes, amidosilanes or aery lo silanes. However, the compatibilizers preferably comprise a modified (functionalized) polymer and optionally a low molecular weight compound having reactive polar groups. Modified olefin polymers, in particular, propylene homopolymers and copolymers, like copolymers of ethylene and propylene with each other or with other alpha olefins, are most preferred, as they are highly compatible with the component A) of the compositions of the present invention. Modified polyethylene can be used as well.

In this context, preference is given to modified polymers containing groups deriving from polar compounds, in particular, selected from acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$-$C_{10}$ linear and branched dialkyl maleates, $C_1$-$C_{10}$ linear and branched dialkyl fumarates, itaconic anhydride, $C_1$-$C_{10}$ linear and branched itaconic acid dialkyl esters, maleic acid, fumaric acid, itaconic acid and mixtures thereof.

Particular preference is given to using a propylene polymer grafted with maleic anhydride as the modified polymer.

The composition optionally comprises an elastomer, also referred to as "rubber". In the present invention, it can be any elastomer known in the art. The elastomer can, for example, be selected from the group consisting of natural rubber, butadiene elastomer, isoprene elastomer, chloroprene elastomer, hydrogenated styrene-butadiene elastomer, styrene-ethylene/butene-styrene block copolymer, hydrogenated styrene-isoprene elastomer, hydrogenated styrene-ethylene/isoprene-styrene block copolymer, acrylic rubber, butyl elastomer, ethylene-propylene elastomer, ethylene-octene elastomer, ethylene-butylene elastomer, styrene-butadiene-styrene elastomer, butylene-propylene elastomer, pentene-propylene elastomer, hexene-propylene elastomer, octene-propylene elastomer, ethylene-propylene-ethylidene norbornene elastomer, ethylene-propylene-vinyl norbornene elastomer, ethylene-propylene-unconjugated diene elastomer, hydrogenated ethylene-butadiene elastomer, styrene butadiene styrene, and mixtures thereof. The preferred elastomers are ethylene-propylene elastomers, ethylene-octene elastomers, ethylene-butylene elastomers, styrene-butadiene-styrene elastomers and mixtures thereof.

The elastomer of component D) can optionally be part of a mixture of said elastomers with a polypropylene being a homopolymer of propylene or a random copolymer of propylene, said homo- or copolymer of propylene is preferably a polypropylene according to the invention but not necessarily.

The composition optionally comprises a polyethylene E). In an embodiment, the polyethylene of component E) is a polyethylene prepared by a metallocene catalyst. In another embodiment, the polyethylene is prepared by a Ziegler-Natta catalyst, by a chromium catalyst, by a Phillips catalyst or by any other suitable catalyst.

The polypropylene compositions according to the invention are obtainable by melting and mixing the components, and the mixing is done in a mixing apparatus at temperatures generally of from 180° C. to 320° C., preferably from 200° C. to 280° C., more preferably from 200° C. to 260° C. Any known apparatus and technology can be used for this purpose.

Useful mixing apparatus in this context are in particular extruders or kneaders, and particular preference is given to twin-screw extruders. It is also possible to premix the components at room temperature in a mixing apparatus.

Preference is given to initially melting component A) and optionally components C), D) and/or E) and subsequently mixing component B) with the melt, in order to reduce the abrasion in the mixing apparatus and the fibre breakage (when fibres are used as filler). During the preparation of the polypropylene compositions of the present invention, besides the main component A) and optional components B), C), D) and/or E), it is possible to introduce additives commonly employed in the art, such as stabilizing agents (against heat, light, U.V.), plasticizers, antistatic and water repellant agents.

Advantageously, the composition of the invention is devoid of VOC inhibitor, deodorant or odour absorbent.

The polypropylene and the polypropylene composition of the present invention may be transformed into articles by a transformation method selected from the group comprising injection moulding, compression moulding, injection blow moulding, injection stretch blow moulding, fibre extrusion, staple fibres and melt blown. Preferably the method of transformation is injection moulding. The articles of the present invention are selected from the group consisting of automobile parts, food or non-food packaging, retort packaging, housewares, cap, closure, media packaging, a medical device, pharmacopoeia package, filters, non-wovens, tissues and textiles. They can also contain one or more living hinges.

The propylene polymer and/or the polypropylene composition according to the invention can be used for any article that is produced by injection moulding. The injection moulding process comprises the steps of:

(a) melting the propylene polymer of the present invention, and (b) injecting the molten propylene polymer from step (a) into an injection mould to form an injection-moulded article.

The injection moulding is performed using methods and equipment well known to the person skilled in the art.

The present invention also relates to the use of the polypropylene and/or of the polypropylene composition according to the present invention for manufacturing moulded articles and in particular for the manufacturing of injection moulded articles. The details and embodiments described above in connection with the polypropylene and with the polypropylene composition also apply to the use according to the present invention.

In particular, examples of articles produced from the inventive polypropylene may be cups, tubs, pails, buckets, toys, household appliances, containers, caps, closures, and crates, to only name a few. The propylene polymer of the present invention is most particularly suited for cups and tubs.

The polypropylene composition according to the invention is most particularly suited for automobile parts. Thus, the composition of the present invention can be used to produce automobile parts such as interior parts like door panels, instrument panels, consoles, A, B, C pillar trims, seat protectors, air ducts, door lists, door trims, air-bag containers and others. The automobile parts also include exterior parts like body panels, bumpers, rocker panels, door lists, side sills, cowl covers and others.

Test Methods

The melt flow index (MFI) of a polypropylene or a polypropylene composition is determined according to ISO 1133, condition L, at 230° C. and 2.16 kg.

Molecular weights are determined by Size Exclusion Chromatography (SEC) at high temperature (145° C.). A 10 mg polypropylene sample is dissolved at 160° C. in 10 ml of trichlorobenzene (technical grade) for 1 hour. Analytical conditions for the GPC_IR5 from WATERS are:

Injection volume: +/−400 µl
Automatic sample preparation and injector temperature: 160° C.
Column temperature: 145° C.
Detector temperature: 160° C.
Column set: 2 Shodex AT-806MS and 1 Styragel HT6E
Flow rate: 1 ml/min
Detector: Infrared detector (2800-3000 cm$^{-1}$)
Calibration: Narrow standards of polystyrene (commercially available)
Calculation for polypropylene: Based on Mark-Houwink relation ($\log_{10}(M_{PP})=\log_{10}(M_{PS})-0.25323$); cut off on the low molecular weight end at $M_{PP}=1000$.

The molecular weight averages used in establishing molecular weight/property relationships are the number average ($M_n$), weight average ($M_w$) and z average ($M_z$) molecular weight. These averages are defined by the following expressions and are determined from the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i M_i} = \frac{\sum_i h_i M_i}{\sum_i M_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight Mi. The third representation in each case (farthest right) defines how one obtains these averages from SEC chromatograms. $h_i$ is the height (from baseline) of the SEC curve at the $i_{th}$ elution fraction and $M_i$ is the molecular weight of species eluting at this increment.

The molecular weight distribution (MWD) is then calculated as Mw/Mn.

Xylene solubles (XS), i.e. the xylene soluble fraction, is determined as follows: between 4.5 and 5.5 g of propylene polymer are weighed into a flask and 300 ml xylene are added. The xylene is heated under stirring to reflux for 45 minutes. Stirring is continued for 15 minutes without heating. The flask is then placed in a thermostat bath set to 25° C.+/−1° C. for 1 hour. The solution is filtered through Whatman no 4 filter paper and 100 ml of solvent are collected.

The solvent is then evaporated and the residue dried and weighed. The percentage of xylene solubles ("XS"), i.e. the amount of the xylene soluble fraction, is then calculated according to:

XS (in wt %)=(Weight of the residue/initial total weight of PP)×300 with all weights being in the same unit, such as for example in grams.

The $^{13}$C-NMR analysis is performed using a 400 MHz or 500 MHz Bruker NMR spectrometer under conditions such that the signal intensity in the spectrum is directly proportional to the total number of contributing carbon atoms in the sample. Such conditions are well known to the skilled person and include, for example, sufficient relaxation time etc. In practice, the intensity of a signal is obtained from its integral, i.e. the corresponding area. The data is acquired using proton decoupling, 2000 to 4000 scans per spectrum with 10 mm room temperature through or 240 scans per spectrum with a 10 mm cryoprobe, a pulse repetition delay of 11 seconds and a spectral width of 25000 Hz (+/−3000 Hz). The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+ %), with HMDS serving as internal standard. To give an example, about 200 mg to 600 mg of polymer is dissolved in 2.0 ml of TCB, followed by addition of 0.5 ml of $C_6D_6$ and 2 to 3 drops of HMDS.

Following data acquisition, the chemical shifts are referenced to the signal of the internal standard HMDS, which is assigned a value of 2.03 ppm.

The isotacticity is determined by $^{13}$C-NMR analysis on the total polymer. In the spectral region of the methyl groups, the signals corresponding to the pentads mmmm, mmmr, mmrr and mrrm are assigned using published data, for example, A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad, a correction is performed for its overlap with a methyl signal related to 2,1-insertions. The percentage of mmmm pentads is then calculated according to:

% mmmm=AREA$_{mmmm}$/(AREA$_{mmmm}$+AREA$_{mmmr}$+AREA$_{mmrr}$+AREA$_{mrrm}$)×100

The ethylene content (% $C_2$) is determined by $^{13}$C-NMR analysis of pellets according to the method described by G. J. Ray et al. in Macromolecules, vol. 10, no 4, 1977, p. 773-778.

Percentage of 2,1-Insertions for a Propylene Homopolymer:

The signals corresponding to the 2,1-insertions are identified with the aid of published data, for example, H. N. Cheng, J. Ewen, Makromol. Chem., vol. 190 (1989), pages 1931-1940. A first area, AREA1, is defined as the average area of the signals corresponding to 2,1-insertions. A second area, AREA2, is defined as the average area of the signals corresponding to 1,2-insertions. The assignment of the signals relating to the 1,2-insertions is well known to the skilled person and need not be explained further. The percentage of 2,1-insertions is calculated according to:

2,1-Insertions (in %)=AREA1/(AREA1+AREA2)·100 with the percentage of 2,1-insertions being given as the molar percentage of 2,1-inserted propylene with respect to total propylene.

Percentage of 2,1-insertions for a random copolymer of propylene and ethylene is determined by two contributions:
A. the percentage of 2,1-insertions as defined above for the propylene homopolymer, and
B. the percentage of 2,1-insertions, wherein the 2,1-inserted propylene neighbours an ethylene, thus, the total percentage of 2,1-insertions corresponds to the sum of these two contributions. The assignments of the signal for case (ii) can be done either by using reference spectra or by referring to the published literature.

Melting temperatures $T_m$ were determined according to ISO 3146 on a DSC Q2000 instrument by TA Instruments. To erase the thermal history the samples are first heated to 200° C. and kept at 200° C. for a period of 3 minutes. The reported melting temperatures $T_{melt}$ are then determined by heating and cooling rates of 20° C./min.

The amount of volatile compound (VOC) is determined according to ATD-GC-FID. Analytical thermal desorption method is known to the man skilled in the art and consists in extracting volatile organic compounds (VOCs) from a non-volatile matrix/sample in a stream of inert gas. The extracted volatiles are subsequently refocused onto a cold trap prior to transfer into a gas chromatographic column (GC) by heating the trap.

According to the invention, the polymer sample is analyzed by ATD/GC coupled to F.I.D (Flame ionization detection) for quantitative detection and mass spectrometry (MS) for qualitative analysis. The polymer sample is submitted to a thermal desorption at 150° C. for 15 min in a furnace. Volatiles are entrained by a stream of helium (15 ml·min$^{-1}$) at a carrier gas pressure of 12.6 psi and trapped on a Tenax cartridge adsorbent cooled to −30° C. Volatiles are then injected onto the chromatographic separation column by heating the trap to 230° C. where they are separated and detected. Calculations are performed using an external calibration curve using 1-hexene as a reference. The compounds are identified based on their retention time. The sum of Cx incorporates the eluting compounds in this retention time zone but may contain oxygen or other compounds.

For the GC-FID, the oven is heated to an initial temperature of 45° C. for 15 min, and then at a rate of 10° C./min up to 280° C. The temperature of 280° C. is maintained for 25 min. The column was HP5–60 m×0.32 mm×1 μm (phase: phenyl methyl siloxane). The FID was performed at a temperature of 280° C. with a hydrogen flow of 45 ml/min and an air flow of 450 ml/min.

For the ATD (ATD: Automatic Thermal Desorber) the transfer line is heated to a temperature of 250° C. and the valve is heated to a temperature of 200° C. For the inlet split, the flow of helium is 25 ml/min and for the outlet split, the flow of helium is 13 ml/min.

Flexural modulus was measured at 23° C. according to ISO 178.

Notched Izod impact strength was measured at 23° C. and −20° C. according to ISO 180.

Haze is determined according to ISO 14782 on samples having 1 mm of thickness.

Spiral flow was determined by a 60-ton Netstal injection moulding machine with a screw having a diameter of 32 mm and an L/D ratio of 25. The melt temperature was 210° C. Injection pressure was set to 800 bar. Mold temperature was kept at 40±1° C. The mould used allows producing a flat ribbon sample of 10 mm width, 1.5 mm of thickness and a length of at most 124 cm.

Viscosity is determined by dynamic rheology analysis.

Rheological Analysis: Determination of the CY Parameters

Oscillatory shear viscosity measurements were performed on a Rheometrics Scientific apparatus (either an RDA700 or an ARES) under a nitrogen atmosphere. The samples were sheared between parallel plates of 25-mm diameter (40-mm for high MFI) with a gap of around 2 mm. The ARES apparatus can be operated with a more sensitive torque transducer for high MFI samples.

The shear strain was set to 10-20% (10% for low MFI samples) and, for most experiments, the melt temperature was 230° C. When different temperatures were used (170, 190, 210, 230 and 250° C.), the frequency scans obtained at the different temperatures were used to construct a master curve at 230° C. First, a horizontal shift was imposed and then (if necessary) a vertical shift was adopted to better superimpose the data to a unique master curve.

The pellets of polypropylene samples were compression-moulded at 200° C. before analysis in the rheometer. All pellets of polypropylene samples contained anti-oxidant. No processing oils or aids were employed as they decrease the viscosity and would hamper an analysis of the effect of $M_W$ and MWD on isotactic polypropylene rheological behaviour. Both pellets and compression-moulded plates were used for analysis.

All the data were analyzed with a statistical analysis software. In all correlations, the statistical significance of the terms was always high (less than one chance out of a hundred of choosing a term when it is not significant). For the fitting to the Carreau-Yasuda equation, the natural log of the shear viscosity was fitted to the RHS of the following equation $$Ln(\eta) = A - C \cdot Ln(1 + (\tau \times W)^b)$$

with $A = Ln(\eta_0)$, $C = (n-1)/b$, and with the fit function (non-linear parameter estimation with maximum likelihood) procedure. It is important to have good first estimates of the starting parameters. A cursory look at the viscosity data can help set good guesses (e.g. use the viscosity at 0.1 rad/s time 10 for broad MWD, b 0.4 and n 0.18; for narrow MWD use the viscosity at 0.1 rad/s, b 0.9 and n 0.4). For the flow curve relaxation time τ, a roughly linear relationship exists between the logarithm of its value and the logarithm of the zero-shear viscosity.

COP (crossover point coordinates: Wc, critical circular frequency, and Gc (critical modulus for which G'=G") and CY parameters are extracted respectively from plots of loss (G") and storage (G') modulus or complex viscosity versus circular frequency as obtained from oscillatory shear tests performed at 230° C. Excel solver was used to get frequencies needed to calculate the ratio w(G'=1000)/w(G"=1000) or COP.

Normal liter (Nl) refers to the volume occupied by a gas delivered under normal temperature and pressure conditions, ie under T=298 K and p=101325 Pa.

EXAMPLES

The advantages of the present invention are illustrated by the following examples.

The advantages of the present invention are illustrated by a comparison of polypropylenes PP1 to PP4. PP1 is an inventive polypropylene, whereas PP2, PP3 and PP4 served as comparative examples. All polypropylenes have been produced by the same polymerization method in liquid propylene in standard conditions. The reaction was conducted in a loop reactor. The hydrogen ratio to propylene, the polymerization temperature and polymerization pressure used to produce each example is given in table 1.

PP1 and PP2 are homopolymers produced using a supported metallocene catalyst with a dimethylsilanediyl-bis(2-methyl-4-phenyl-indenyl)zirconium dichloride as metallocene component supported on a silica which has been previously activated with MAO (i.e. the support is MAO/$SiO_2$). PP3 and PP4 are homopolymers produced using a Ziegler-Natta Avant phthalate based commercial catalyst from LBI.

TABLE 1

|  | Unit | PP1 | PP2 | PP3 | PP4 |
|---|---|---|---|---|---|
| Ratio $H_2/C_3$ | Nl $H_2$/kg $C_3$ | 0.04 | 0.02 | 0.25 | 0.11 |
| Polymerization temperature | ° C. | 70 | 70 | 70 | 70 |
| Polymerization Pressure | Bar | 33 | 33 | 33 | 33 |

Nl = Normal Liter

Properties of the polypropylenes are given in Table 2. The accuracy on the result of the analysis is given in parenthesis.

TABLE 2

|  | Unit | PP1 | PP2 | PP3 | PP4 |
|---|---|---|---|---|---|
| MWD (+/−10%) |  | 3.4 | 2.9 | 6.6 | 6.9 |
| Mn (+/−10%) | kg/mol | 31 | 54 | 20 | 29 |
| mmmm pentads (+/−0.5%) | % | 98.9 | 99.2 | 94.0 | 93.9 |
| 2, 1 insertions (+/−0.1%) | % | 0.9 | 0.9 | 0 | 0 |
| Xylene solubles (+/−0.5 wt %) | wt % | 0.6 | 0.5 | 2.3 | 3.3 |
| Tm (+/−1° C.) | ° C. | 150 | 151 | 165 | 162 |
| VOC (+/−20%) | ppm | 62 | 33 | 1631 | 504 |
| Izod Impact strength (notched) at 23° C. (+/−18%) | kJ/m² | 2 | 2 | 2 | 3 |
| Flexural Modulus (+/−50 MPa) | MPa | 1400 | 1300 | 1400 | 1400 |
| Haze on 1 mm thickness (+/−5%) | % | 53.2 | 54.1 | 73.6 | 62.5 |

The rheological properties of the polypropylenes have been determined and are given in Table 3. The accuracy on the result of the analysis is given in parenthesis.

TABLE 3

|  | Unit | PP1 | PP2 | PP3 | PP4 |
|---|---|---|---|---|---|
| Viscosity at zero shear rate ($\eta_0$) (+/−5%) | Pa · s | 71.69 | 309.82 | 110.59 | 527.95 |
| b (+/−5%) |  | 0.9051 | 0.7261 | 0.4846 | 0.5359 |
| τ (+/−5%) | s | 0.0025 | 0.0070 | 0.0028 | 0.0138 |
| n |  | 0.2689 | 0.2891 | 0.1102 | 0.2540 |
| RP1 [1] |  | 1.08 | 0.75 | 1.15 | 0.72 |
| W(G' = 1000) | Rad · s⁻¹ | 73 | 17.2 | 43.3 | 9.3 |

TABLE 3-continued

|  | Unit | PP1 | PP2 | PP3 | PP4 |
|---|---|---|---|---|---|
| W(G" = 1000) | Rad · s⁻¹ | 14.5 | 3.5 | 13.5 | 2.3 |
| RP2 [2] |  | 5.0 | 4.9 | 3.2 | 4.0 |
| Spiral flow (+/−50 mm) | mm | 791 | 506 | 851 | 549 |

[1] RP1 is the first rheological parameter according to the invention and is defined as below:
RP1 = 2.18 − 1.715(b) − 0.015(Ln$\eta_0$)² + 0.944(b)² + 0.0149(Ln$\eta_0$)(Lnτ) + 0.0095(Lnτ)²
[2] RP2 is the second rheological parameter according to the invention and is defined to be:
RP2 = w(G' = 1000)/w(G" = 1000)

The above results regarding the first and second rheological parameter (RP1 and RP2) and spiral flow show that a better processability of the resin is obtained for PP1 in comparison to PP2. It is further noted that the polypropylene of the invention shows a good purity, as the VOC is maintained below 100 ppm. Thus the inventive polypropylene PP1 shows an improved processability and purity for similar optical and mechanical properties, such as rigidity compared to PP2.

The results are comparable for PP1 and PP3 regarding the first rheological parameter (RP1) but the second rheological parameter (RP2) is lower for PP3 compared to PP1. PP1 and PP3 show the same impact properties, same rigidity and similar processability. However, when compared to PP3, it can be seen that PP1 shows an improved haze (optical properties) and an improved purity. Thus the inventive polypropylene PP1 shows an improved balance between processability, purity, optical and mechanical properties such as rigidity, compared to PP3.

The results are comparable for PP2 and PP4 regarding the first rheological parameter (RP1) but the second rheological parameter (RP2) is lower for PP4 compared to PP2. PP2 to PP4 shows similar impact properties, similar rigidity and similar processability, but better purity with lower VOC.

Comparison of the first and second rheological parameter (RP1 and RP2) and spiral flow shows that a better processability of the resin is obtained for PP3 in comparison to PP4. However, it can be seen also that higher processability goes with a dramatic increase of VOC. To the contrary and surprisingly, it can be seen that the increase of processability obtained for PP1 in comparison to PP2 goes with comparable VOC.

The polypropylenes of the present invention are therefore characterized by an improved balance of processability and purity.

The invention claimed is:

1. A polypropylene comprising:
   (i) a percentage of 2,1-insertions, relative to a total number of propylene units in a polymer chain, of at least 0.2%;
   (ii) a melting temperature $T_m$ ranging from 140° C. to 160° C. as determined according to ISO 3146;
   (iii) a ratio of frequencies at fixed modulus of 1000 Pa for storage shear modulus (G') and loss shear modulus (G") greater than 4.7;
   (iv) Carreau-Yasuda parameters $\eta_0$, b and τ complying with a relationship:

$$2.18 - 1.715(b) - 0.015(\text{Ln } \eta_0)^2 + 0.944(b)^2 + 0.0149(\text{Ln } \eta_0)(\text{Ln } \tau) + 0.0095(\text{Ln } \tau)^2 > 1$$

when fitted to a Carreau-Yasuda equation, wherein the Carreau-Yasuda parameters $\eta_0$, b and τ are determined from a dynamic rheology analysis (RDA);
   (v) a molecular weight distribution (MWD) of at least 2.5; and (vi) a number average molecular weight (Mn) of at most 45 kg/mol.

2. The polypropylene according to claim 1, wherein the Carreau-Yasuda parameters $\eta_0$, b and $\tau$ comply with the relationship:

$$2.18-1.715(b)-0.015(\text{Ln } \eta_0)^2+0\ 0.944(b)^2+0.0149(\text{Ln } \eta_0)(\text{Ln } \tau)+0.0095(\text{Ln } \tau)^2 > 1.02.$$

3. The polypropylene according to claim 1, wherein the Carreau-Yasuda parameters $\eta_0$, b and $\tau$ comply with the relationship:

$$2.18-1.715(b)-0.015(\text{Ln } \eta_0)^2+0\ 0.944(b)^2+0.0149(\text{Ln } \eta_0)(\text{Ln } \tau)+0.0095(\text{Ln } \tau)^2 < 1.50.$$

4. The polypropylene according to claim 1, wherein the Carreau-Yasuda parameter b is greater than 0.3.

5. The polypropylene according to claim 1, further comprising:
a xylene solubles content less than 1.5 wt % relative to total weight of the polypropylene; and/or
a percentage of 2,1-insertions, relative to the total number of propylene units in the polymer chain, of at least 0.4%.

6. The polypropylene according to claim 1, wherein:
the molecular weight distribution is at least 2.6; and/or
the number average molecular weight is at most 42 kg/mol; and/or
the number average molecular weight is at least 15 kg/mol.

7. The polypropylene according to claim 1, wherein a content of mmmm pentads of at least 90%.

8. The polypropylene according to claim 1, wherein the polypropylene is a homopolymer, wherein a comonomer content in the polypropylene is less than 0.2 wt % based on a total weight of the polypropylene.

9. The polypropylene according to claim 1, wherein the polypropylene has less than 100 ppm of volatile organic compounds as determined in accordance with ATD-GC-FID.

10. The polypropylene according to claim 1, wherein the polypropylene has a melting temperature $T_m$ of at most 158° C. as determined according to ISO 3146.

11. The polypropylene according to claim 1, wherein the polypropylene has been polymerized in the presence, of a supported metallocene catalyst having dimethylsilyl-bridged bis(indenyl)zirconium dichloride as metallocene component wherein the indenyl is substituted.

12. A polypropylene composition comprising:
(A) from 10 to 95 wt % relative to a total weight of the polypropylene composition of a polypropylene, the polypropylene comprising:
(i) a percentage of 2,1-insertions, relative to a total number of propylene units in a polymer chain, of at least 0.2%;
(ii) a melting temperature $T_m$ ranging from 140° C. to 160° C. as determined according to ISO 3146;
(iii) a ratio of frequencies at fixed modulus of 1000 Pa for storage shear modulus (G') and loss shear modulus (G") greater than 4.7;
(iv) Carreau-Yasuda parameters $\eta_0$, b and $\tau$ which comply with a relationship:

$$2.18-1.715(b)-0.015(\text{Ln } \eta_0)^2+0\ 0.944(b)^2+0.0149(\text{Ln } \eta_0)(\text{Ln } \tau)+0.0095(\text{Ln } \tau)^2 > 1$$

when fitted to a Carreau-Yasuda equation, the Carreau-Yasuda parameters $\eta_0$, b and $\tau$ being determined from a dynamic rheology analysis (RDA);
(v) a molecular weight distribution (MWD) of at least 2.5; and
(vi) a number average molecular weight (Mn) of at most 45 kg/mol.,
and at least 5 wt % relative to the total weight of the polypropylene composition of one or more selected from:
(B) from 0 to 50 wt % relative to the total weight of the polypropylene composition of a filler;
(C) from 0 to 5 wt % relative to the total weight of the polypropylene composition of a compatibilizer;
(D) from 0 to 90 wt % relative to the total weight of the composition of an elastomer, or of a mixture of an elastomer and a homopolymer of propylene, or of a mixture of an elastomer and a random copolymer of propylene; or
(E) from 0 to 15 wt % relative to the total weight of the polypropylene composition of a polyethylene.

13. The polypropylene composition according to claim 12 wherein the composition is devoid of VOC inhibitor, deodorant or odour absorbent.

14. An injection molded article produced from the polypropylene according to claim 1.

15. An automobile part produced from the polypropylene composition of claim 12.

* * * * *